[11] 3,603,684

[72] Inventor Ralph F. Wuerker
Palos Verdes Estates, Calif.
[21] Appl. No. 886,077
[22] Filed Dec. 18, 1969
[45] Patented Sept. 7, 1971
[73] Assignees TRW, Inc.
Redondo Beach, Calif.

[54] RECORDING HOLOGRAMS OF OBJECTS WITH RANGE CONTOURS
17 Claims, 3 Drawing Figs.
[52] U.S. Cl. .................................... 356/109,
331/94.5, 350/3.5
[51] Int. Cl. .................................... G02b 27/00,
G01b 9/02
[50] Field of Search ............................ 350/3.5;
331/94.5; 356/2, 106, 109

[56] References Cited
UNITED STATES PATENTS
3,482,184 12/1969 Schneider et al. ............ 331/94.5
OTHER REFERENCES
Abella et al., Jour. of Applied Physics, Vol. 32, No. 6, June 1961, pp. 1177-1178 (331-94.5)
Calviello et al., IEEE Jour. of Quantum Electronics, Vol. QE-1, No. 3, June 1965, p. 132 (331-94.5)
Hildebrand et al., Jour. of the Optical Society of America, Vol. 57, No. 2, Feb. 1967, pp. 155-162 (350-3.5)
Bradley et al., Lasers and Unconventional Optics Jour., No. 8, 1967, pp. 133-134 (331-94.5)

*Primary Examiner*—David Schonberg
*Assistant Examiner*—Ronald J. Stern
*Attorneys*—Daniel T. Anderson, Edwin A. Oser and Jerry A. Dinardo ABSTRACT: Holographic contour maps with closed controllable spacing of the range contours are made with one or two ruby lasers. For example, two ruby lasers may be provided, each being operated at a different temperature so as to illuminate the object with two separate frequencies. Alternatively, one of the rods may consist of pink ruby and the other of dark ruby. Also, two separate exposures may be taken, each being made with the ruby laser operated at a different frequency. This may be accomplished by selectively causing the ruby to lase at either a frequency corresponding to a transition $R_1$ or $R_2$. By controlling the material of the ruby, or its temperature or the particular transition being energized, the spacing of the range contours may be controlled or made adjustable.

The invention herein described was made in the course of or under a contract or subcontract thereunder, with the Department of the Air Force.

Ralph F. Wuerker
INVENTOR

RECORDING HOLOGRAMS OF OBJECTS WITH RANGE CONTOURS

CROSS-REFERENCE TO RELATED APPLICATION

The present application is related to the copending U.S. Pat. application to Heflinger and Wuerker, filed concurrently herewith, Ser. No. 886,258 (D-4946) entitled Multifrequency Lasers for Holographic Contouring, and assigned to the assignee of the present invention. The copending application discloses holographic apparatus for causing a ruby laser to lase simultaneously at two controllable frequencies to obtain range contours with desired spacings.

BACKGROUND OF THE INVENTION

This invention relates generally to holography and particularly relates to a method of and apparatus for obtaining holographic contour maps of objects by one or two ruby lasers operated at separate, closely adjacent frequencies.

Holographic contour maps of the type to which the present invention relates have been made in the past by means of gas lasers which lase at two frequencies. The spacing of the range contours is dependent on the generation adjacent fringes. These may be created by illuminating an object with coherent light of two separate frequencies. This spacing depends inversely on the frequency difference. Accordingly, it is highly desirable to be able to control the frequencies so as to obtain contour ranges with a desirable spacing. As will be shown subsequently, the distance between adjacent fringes is inversely proportional to the difference between the two illuminating frequencies.

Accordingly, it is desired to utilize a laser or lasers generating wavelength differences which are both very small but yet controllable. This should make it possible to obtain fringe spacings on the order of 0.1 to 1 millimeter or larger. This cannot be effected with a conventional gas laser because there the frequency difference usually is too large, resulting in impractically small distances between adjacent fringes. Furthermore, there is no possibility to control or adjust the distance between adjacent fringes which are projected or generated on the object.

It is accordingly an object of the present invention to provide a novel method of and apparatus for obtaining holographic contour maps with a small spacing of the type suitable, for example, for machining parts to close tolerances.

Another object of the present invention is to provide a method of and apparatus of the type previously discussed which permits the generation of contour fringes having controllable distances.

A further object of the present invention is to provide apparatus for generating monochromatic light at two different wavelengths by means of one or two ruby lasers of different temperatures or of different materials or arranged to favor a desired transition between two predetermined energy levels of the chromium ion.

SUMMARY OF THE There are

A holographic apparatus in accordance with the present invention serves the purpose of recording holograms of an object to be recorded, the object having range contours thereon. The apparatus may include, for example, a first and a second laser, each having a ruby rod and a light source for pumping its associated ruby rod. There are also provided first and second means for causing the respective lasers to lase at predetermined but different frequencies. The output light of the two lasers is then split by a beam splitter for generating a reference beam and a scene beam. Light-sensitive means such, for example, as a photographic plate or a film or a photochromic material is disposed in a predetermined plane for recording a hologram of an object. Optical means are provided for directing the reference beam toward the light-sensitive means and other optical means for directing the scene beam onto the object and thence onto the light-sensitive means. Since the object is now illuminated with laser light of two separate frequencies, range contours are produced on the object. The spacing of the range contours is dependent on the frequency difference of the two light beams developed by the two lasers.

The two lasers may be operated either simultaneously or in sequence, that is, one after another. In the second case, two separate exposures of the object may be taken, each at a different frequency. The two lasers may each be maintained at a different temperature. Alternatively the two ruby rods may consist respectively of pink and dark ruby. Accordingly the wavelength differences are small and may be controllable, thereby to control the distance between adjacent fringes generated on an object, that is, the differences of the range contours.

BRIEF DESCRIPTION OF THE DRAWINGS

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings wherein:

FIG. 3 is a schematic view of a laser which may be caused to lase at will either at the $R_1$ or at the $R_2$ transition to generate monochromatic light of two different frequencies.

DESCRIPTION OF THE PREFERRED EMBODIMENTS

Figure 1:
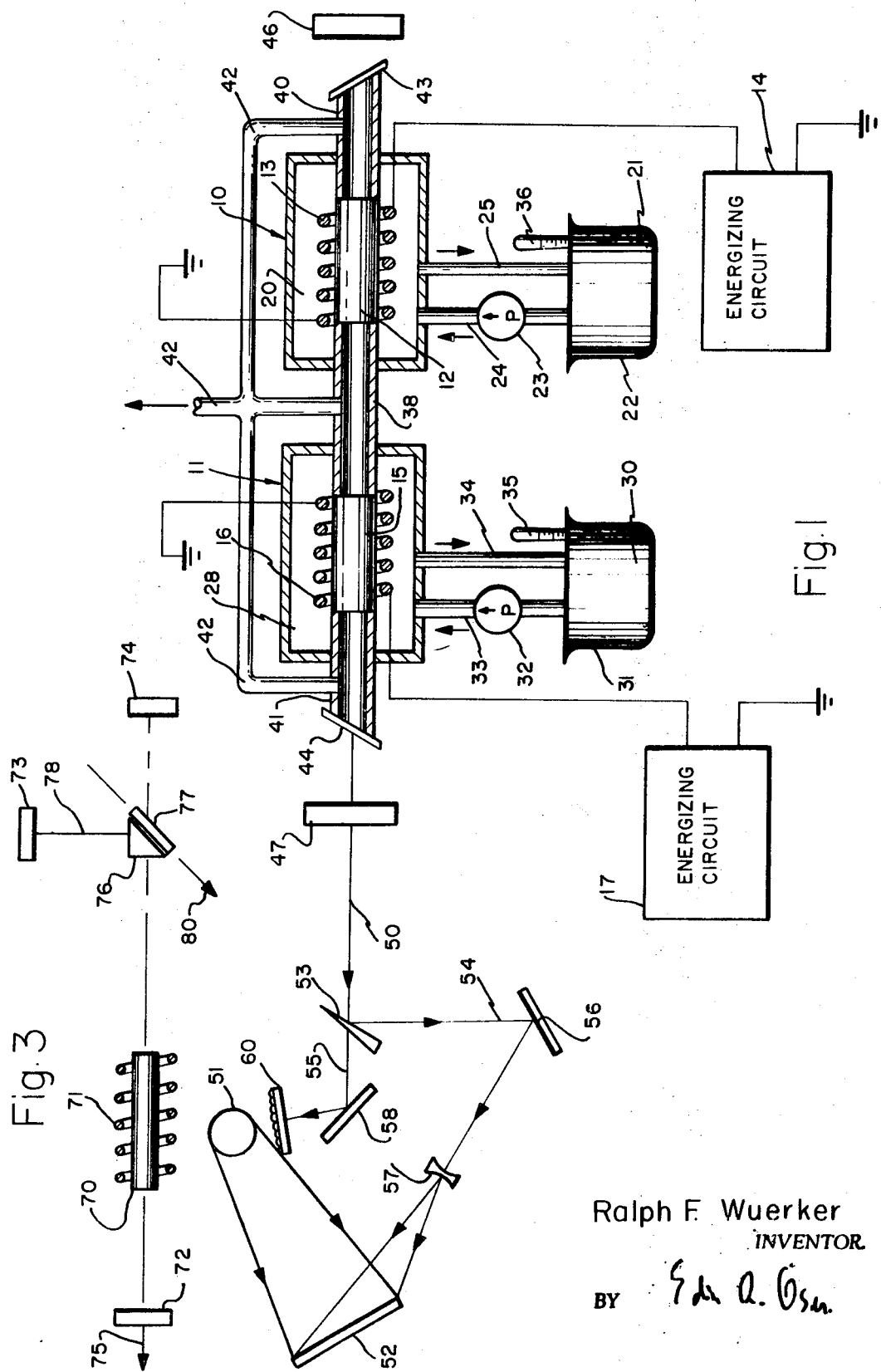
FIG. 1 is a schematic view of a holographic apparatus in accordance with the present invention including two separate laser rods which may be maintained at different temperatures.

Referring now to the drawings and particularly to FIG. 1, there is illustrated a holographic apparatus in accordance with the present invention. The apparatus of FIG. 1 includes a laser system having two laser housings generally indicated at 10 and 11. The laser housing 10 includes a ruby rod 12 which may be pumped by a flashlamp 13 which may, for example, be a Xenon lamp and which is energized by an energizing circuit 14. Accordingly, by energizing the circuit 14 the flashlamp 13 may be made to emit light which then pumps the ruby rod 12 until it is ready to lase. The second laser housing 11 also includes a ruby rod 15 which may be energized by a second flashlamp 16 through an energizing circuit 17.

The laser rod 12 may be enclosed in a liquid-proof housing 20 for maintaining its temperature at a predetermined value. For example, a suitable liquid 21 such as water may be disposed in a container 22. This liquid 21 may be pumped by a pump 23 out of the container 22 by a conduit 24 into the housing 20 and back into the container 22 by another pipe or conduit 25 as shown by the arrow. Similarly the laser rod 15 may be enclosed by a liquid-proof housing 28 for maintaining the rod 15 at a different predetermined temperature. To this end, another liquid, such for example, as an alcohol and dry ice 30 mixture may be housed in a container 31 and may be pumped by the pump 32 through a pipe 33 into the housing 28 and back again through a pipe 34 into the container 31. A thermometer indicated at 35 may be disposed in the liquid 30 to indicate its temperature. Similarly another thermometer 36 may be disposed in the liquid 21 which may, for example, be water at room temperature or else hot water.

Accordingly it will be seen that each of the laser rods 12 and 15 may be maintained at a different and predetermined temperature for the purpose of generating light of a predetermined frequency. This will be more fully explained hereinafter. The space between the two laser rods 12 and 15 may be evacuated by means of housing 38 which may extend to the other ends of the two ruby rods 12 and 15 as shown at 40 and 41. By means of a suitable pipe 42, the space surrounding the two laser rods 12 and 15 may be evacuated or else cooled by means of dry ice to prevent water vapor from depositing on the faces of the ruby rods 12 and 15.

The housing portions 40 and 41 are preferably provided with transparent windows 43 and 44, which are arranged at the Brewster angle, thereby to cause the transmission of polarized light with minimum loss through the windows. An optical cavity is provided by means of the two end mirrors 46 and 47 which are preferably front surface mirrors. The two mirrors 46 and 47 enclose both laser rods 12 and 15 with their housing portions 40 and 41. Preferably the mirror 46 is made substantially entirely reflecting and may reflect 99 percent of the light. The other mirror 47 is the output mirror from which the laser beam 50 emerges. It should have a reflectivity between say 20 percent and 95 percent so as to pass the laser beam 50 after 100 or more reflections between the two mirrors 46 and 47.

The actual holographic arrangement for taking a hologram of an object 51 includes a light-sensitive medium 52 which may, for example, consist of a photographic plate, a film or a photochromic material. The initial laser beam 50 is split by a beam splitter 53 into a reference beam 54 and a scene beam 55. The beam splitter, as shown, may consist of a wedge of glass reflecting a portion of the light to form the reference beam 54. The reference beam 54 is then reflected by another light reflector 56 which may again be a front surface mirror. The reference beam may then be enlarged by a negative lens 57 so that the reference beam entirely fills the surface of the hologram 52.

The scene beam 55 may be reflected by another reflector 58 which may be identical with the reflector 56 and may then be passed through a light diffuser 60 disposed between the scene beam 55 and the object 51. The purpose of the diffuser 60 is to provide more uniform light for the object 51. A portion of the light scattered from the object 51 then falls on the recording medium 52 where it interferes with the reference beam 54 to record both amplitude and phase of the scattered light waves.

It is well known that when a hologram is taken of an object in the light of two lasers of slightly different wavelengths or frequencies, then contours are produced on the object. These holographic contour maps are caused by spaced fringes generated by the interference of two light sources of slightly differently wavelengths. Adjacent fringes which are seen in the hologram of the object indicate separations in distance as shown by the following formula:

$$\Delta D = \frac{1}{2}\left[\frac{\lambda_1 \lambda_2}{\lambda_1 - \lambda_2}\right] \simeq \frac{\lambda^2}{2(\Delta\lambda)} \quad (1)$$

wherein $\Delta D$ is the distance between adjacent fringes, $\lambda_1$ and $\lambda_2$ are the wavelengths of the two lasers and $\Delta\lambda$ is the difference of the two wavelengths It can be shown that the two optical frequencies, fill the object space with ellipsoidal surfaces. These surfaces have foci at the origin of the light source and on the point on the hologram which is on the axis of the view.

In accordance with the present invention these two adjacent or slightly different wavelengths may be obtained by utilizing two identical laser rods such as 12 and 15, each being maintained at a different temperature. The resulting contour spacing is shown by the Table I which follows:

This table shows that by using various combinations of temperatures, contour spacing between 0.16 and 1.21 mm. may readily be obtained. Thus the smallest contour spacing corresponds to the largest wavelength difference between the temperature range of −190° C. and +100° C. while the largest contour spacing corresponds to the two temperatures of 0° C. and 20° C.

The above Table I is for the transition line known as $R_1$ for ruby. The temperature variation for the range between +20° C. and −80° C. may be approximated by the following equation:

$$\Delta D(T) = 7.1 \text{ cm.}/(T-20)° = 2.8''/(T-20)° \quad (2)$$

where $T$ is the temperature within the range of +20° C. and −80° C. The formula gives the value for centimeters and inches.

Instead of using temperature variations of two pink ruby rods, it is also feasible to use one dark ruby rod and one pink ruby rod. In general, pink ruby has an addition or doping of chromium on the order of 0.05 percent, while dark ruby has a doping of chromium of 0.5 percent, the chromium existing in its triple ionized state in the crystal. Dark ruby lasers simultaneously lase in the so-called N transition lines at 7009A and 7041A. In this case, the contour lines are separated by 0.076 millimeters. Alternatively, as mentioned, it is also possible to utilize both a pink and a dark ruby rod. At room temperature, the two ruby rods will lase at 6943 and simultaneously at 7,041 and 7,009A. With such an arrangement, contour spacings of 24 micron and 38 micron are obtainable.

In general it would be desired to energize both lasers 10 and 11 simultaneously be energizing the circuits 14 and 17 simultaneously. In that case a single hologram will show the contour lines. On the other hand, it is also feasible to energize one of the two lasers 10 or 11 at one time and the other one at a later time. In that case, two separate exposures may be made on the same hologram or film to obtain the desired contour spacing. As mentioned before, if a dark ruby rod is used, it may not be necessary to have more than one laser because the dark ruby lases simultaneously at two closely adjacent frequencies.

Figure 2:
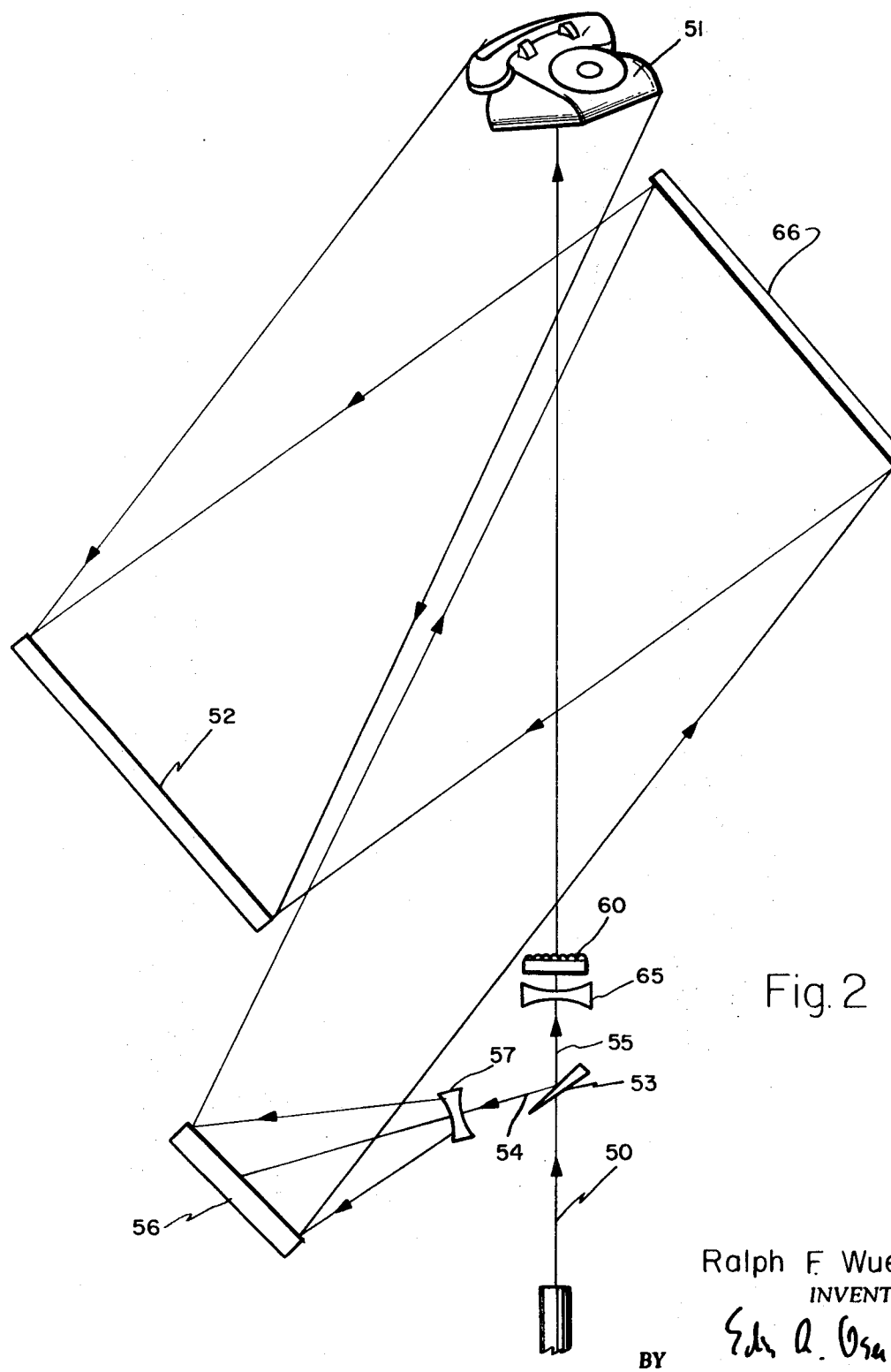
FIG. 2 is a schematic view of a modified apparatus for taking, for example, two separate exposures of a stationary object, each being obtained with light of a different frequency.

An alternative embodiment of the holographic apparatus of the invention is illustrated in FIG. 2, to which reference is now made. Here a laser beam 50 is split into a reference beam 54 and a scene beam 55 by the beam splitter 53. A negative lens 57 is again in the path of the reference beam which is reflected by its reflector 56 and a reflector 66 onto the hologram 52. The same beam 55 may also be enlarged by a negative lens 65 and the light may be diffused by a light diffuser 60 to illuminate the object 51 more uniformly. The light scattered from the object 51, which may, for example, be a telephone, are recorded on the recording medium 52 because the scattered waves interfere with the reference wave. Both amplitude and phase is again recorded.

The holographic apparatus of FIG. 2 may be used by making two single exposures on the recording medium 52 by means of two separate lasers, such as a pink or dark rub rod. Alternatively, they may be made with the arrangement of FIG. 1 by alternately energizing the lasers 10 and 11.

It is well known that a laser having a pink ruby rod is capable of lasing at two different transitions known as $R_1$ and $R_2$. Table II to which reference is now made, shows the wavelength obtainable for the two transitions $R_1$ and $R_2$ at different temperatures.

TABLE I

| Temperature in degrees centigrade (C.) | Wavelength in angstrom (A) | ∇D in mm. | | |
|---|---|---|---|---|
| 100 | 6,948 | | | |
| | | 0.48 | | |
| 20 | 6,943 | | 0.34 | |
| | | | | 0.40  0.16 |
| 0 | 6,941 | 1.21 | | |
| −80 | 6,937 | 0.60 | 0.30 | |
| | | 0.60 | | |
| −190 | 6,933 | | | |

TABLE II

| Temperature in degrees C. | Wavelength $R_1$ in A | Wavelength $R_2$ in A | Δλ in A | ΔD in mm. |
|---|---|---|---|---|
| 100 | 6,948 | 6,932 | 16 | 0.151 |
| 20 | 6,943 | 6,928 | 15 | 0.160 |
| 0 | 6,941 | 6,927 | 14 | 0.172 |
| −80 | 6,937 | 6,923 | 14 | 0.172 |
| −190 | 6,933 | 6,920 | 13 | 0.185 |

Two separate exposure holograms may be obtained with the two transition lines $R_1$ and $R_2$ by means of the apparatus of FIG. 3. FIG. 3 illustrates a laser which may be made to lase at either wavelength $R_1$ or at the wavelength $R_2$. To this end there is provided a ruby rod 70 which should be of pink ruby and which may be pumped by a flashlamp 71. The optical cavity is defined by a partially reflecting mirror 72 which may, for example, reflect 50 percent of the light at both wavelengths $R_1$ and $R_2$. The other limit of the optical cavity is determined either by the light reflector 73 or by the reflector 74. The light reflector 73 is so made by means of dichroic coating that it reflects on the order of 99 percent of the light at the wavelength $R_1$. The other reflector 74 is preferably also a dichroic mirror so that it reflects approximately 99 percent of the light of the wavelength $R_2$. Accordingly when the mirror 73 determines the optical cavity, the laser will emit light as shown at 75, consisting substantially only of the wavelength corresponding to $R_1$. On the other hand, when the mirror 74 determines the optical cavity, the light consists substantially only of the wavelength $R_2$.

A selection between the two mirrors may be made by the prism 76 and total reflector 77, such as mirror 77. When the unit 76, 77 is in the light path, the light is reflected at right angles as shown at 78 to impinge on the mirror 73 and then reflect back to the mirror 72. This, as mentioned before will cause the generation of light at the frequency $R_1$ only.

If the prism 76 and light reflector 77 is now removed as schematically shown by the arrow 80, the light will proceed directly to the mirror 74 and then back to the mirror 72 so as to select light of the wavelength $R_2$.

Instead of providing the prism 76 and light reflector 77, it is feasible to use a Kerr cell in the light path and a birefringent prism such as a calcite prism. By energizing the Kerr cell with a suitable electric potential, the light beam may be deflected toward one of the two mirrors.

In addition, of course, it is also feasible to control the temperature of the laser 70 in the manner previously disclosed in connection with FIG. 1. This will then permit the control of the contour spacing between 0.151 and 0.185 millimeter as shown in TABLE II.

It should be noted that a laser as shown in FIG. 3 normally lases at the $R_1$ line, which is the lower line. The $R_2$ line is only obtainable under special conditions as shown in FIG. 3. The mirror 72, as well as the mirror 73, preferably are special mirrors with dichroic coatings which have high loss at one wavelength and low loss at the other wavelength. The temperature sensitivity of the $R_1$ and $R_2$ lines is due to the sapphire host of the ruby crystals.

It should also be noted that if two separate exposures are made it is, of course, important that the object has not moved between the two exposures. Such a two-exposure hologram can therefore usually be made only of stationary objects.

The contour spacings available with the laser system of the present invention are particularly in that range which is of interest to a machine shop, or for the manufacture of typical metal parts.

There has thus been disclosed holographic apparatus for making holograms of objects having fringe spacings which are controllable and relatively narrow. This may be effected by taking a hologram with two ruby lasers, each maintained at a different temperature. Alternatively, one laser may be a light ruby laser and the other a dark ruby laser; or else it is feasible to use only a dark ruby laser which will lase at two separate frequencies. Instead of taking a single hologram, it is also feasible to take two separate holograms with the same recording medium, each taken with a laser having a slightly different frequency. This may, for example, be effected by causing a laser to lase at will either at the $R_1$ or the $R_2$ transition.

What is claimed is:

1. Apparatus for recording holograms of an object to be recorded and having range contours thereon, said apparatus comprising:
    a. a first laser including a first ruby rod;
    b. a first light source for pumping said first ruby rod;
    c. first means for causing said first laser to lase at a first predetermined frequency;
    d. a second laser including a second ruby rod;
    e. a second light source for pumping said second ruby rod;
    f. second means for causing said second laser to lase at a second predetermined frequency;
    g. a beam splitter for splitting the light from said lasers into a reference beam and a scene beam;
    h. light sensitive means disposed in a predetermined plane for recording a hologram of an object;
    i. first fixed optical means for directing said reference beam toward said light-sensitive means; and
    j. second optical means for directing said scene beam onto the object to be recorded and thence onto said light-sensitive means, the difference in frequency of said predetermined frequencies being such that range contours are produced on the object having a spacing of no less than about 0.1 millimeter and both said optical means being fixedly disposed relative to each other so that each of said reference beams and each of said scene beams from said lasers travels respectively along identical paths to said light-sensitive means.

2. Apparatus as defined in claim 1 wherein said first and second light source are energized simultaneously.

3. Apparatus as defined in claim 1 wherein said first and second light source are energized in sequence, whereby two separate exposures of the object may be taken, each at a different frequency.

4. Apparatus as defined in claim 1 wherein said first and second means maintains said first and said second ruby rod, each at a predetermined and different temperature.

5. Apparatus as claimed in claim 1 wherein said first ruby rod consists of pink ruby and said second ruby rod consists of dark ruby.

6. Holographic apparatus for recording holograms of objects covered with range contours of relatively small spacing comprising:
    a. a laser including a ruby rod capable of lasing at either a wavelength $R_1$ or $R_2$;
    b. a light source pumping said ruby rod;
    c. an optical cavity defined by a first light reflector capable of transmitting light from said laser and a second and a third light reflector, sad second light reflector reflecting substantially only light waves of a wavelength corresponding to $R_1$, said third reflector reflecting substantially only light of a wavelength corresponding to $R_2$;
    d. optical means for directing light at will either toward said second or said third mirror, thereby to cause said laser to lase either at a wavelength $R_1$ or $R_2$;
    e. a beam splitter for splitting the light from said laser into a reference and a scene beam;
    f. a light-sensitive medium disposed in a predetermined plane for recording a hologram;
    g. fixed means for directing said reference beam toward said light-sensitive medium; and
    h. means for directing said scene beam onto an object to be recorded and thence onto said light-sensitive medium, said means for directing said reference beam and said scene beam being fixedly disposed relative to each other so that said reference and scene beams of each wavelength travels respectively along identical paths to said light sensitive means, whereby successive holograms may be recorded in light corresponding to $R_1$ and in light corresponding to $R_2$ by selectively directing the light of said laser toward said second or said third light reflector, the difference in frequency of said wavelengths $R_1$ and $R_2$ being such that range contours of the object are produced on the hologram having a spacing of no less than about 0.1 millimeter.

7. A method of recording a hologram of an object to be recorded and having range contours thereon, said method comprising the steps of:
    a. generating a first substantially coherent laser beam from a ruby laser, said laser beam having a first predetermined frequency;
    b. spitting said laser beam into a first reference beam and a first scene beam;

c. directing said first reference beam onto a light-sensitive medium disposed in a predetermined plane;

d. directing said first scene beam onto the fixed object to be recorded and thereupon onto said light-sensitive medium for recording a first hologram;

e. generating a second substantially coherent laser beam from a ruby laser, said second laser beam having a second predetermined frequency, f. splitting the light from said second laser beam into a second reference beam and a second scene beam;

g. directing said second reference beam onto said light-sensitive medium at the same angle as said first reference beam is directed onto said medium;

h. directing said second scene beam onto the fixed object and thereupon onto said light-sensitive medium, the frequency difference of said two laser beams being such that range contours are produced on the object, said range contours having a spacing no less than about 0.1 millimeter; and i. each of said first and second reference beams and each of said fist and second scene beams being directed along identical paths toward said light-sensitive medium.

8. The method as defined in claim 7 wherein said ruby laser is maintained at two different predetermined temperatures for generating in succession said first and said second laser beam.

9. The method as defined in claim 7 wherein said ruby laser is successively operated at the transition $R_1$ and at the transition $R_2$ for generating said first and said second laser beam.

10. The method as defined in claim 7 wherein said first laser beam is generated by a first ruby laser including a pink ruby rod and said second laser beam is generated by a ruby laser having a dark ruby rod to develop the two laser beams at different frequencies.

11. The method as defined in claim 7 wherein said two laser beams are developed by two separate ruby lasers, each capable of generating a laser beam at a different predetermined frequency.

12. Apparatus for recording holograms of an object to be recorded and having range contours thereon, said apparatus comprising:

a. laser means for generating a first laser beam having a first predetermined frequency and a second laser beam having a second predetermined frequency;

b. means for splitting said laser beams into a reference beam and a scene beam;

c. light-sensitive means disposed in a predetermined plane for recording a hologram of a fixed object;

d. first optical means for directing said reference beam toward said light-sensitive means at a fixed angle; and e. second optical means for directing said scene beam onto the object and thence onto said light-sensitive means for recording reference and scene beams at both of said frequencies, the frequency difference of said predetermined frequencies being such that range contours produced on the object have a spacing of no less than about 0.1 millimeter both said optical means being fixedly disposed relative to each other so that each of said reference beams and each of said scene beams from said laser means travels respectively along identical paths to said light-sensitive medium.

13. Apparatus as defined in claim 12 wherein said first and second laser beams are generated simultaneously.

14. Apparatus as defined in claim 12 wherein said first and second laser beams are generated in sequence.

15. A method of recording a hologram of an object to be recorded and having range contours thereon, said method comprising the steps of:

a. generating a first, substantially coherent laser beam having a first predetermined frequency and a second, substantially coherent laser beam having a second predetermined frequency;

b. splitting said laser beams into a reference beam and a scene beam;

c. directing said reference beam at a fixed angle onto a light-sensitive medium disposed in a predetermined plane;

d. directing said scene beam onto the fixed object to be recorded and thereupon onto said light-sensitive medium for recording a hologram by both of said laser beams, the frequency difference of said predetermined frequencies of said two laser beams being such that range contours are produced on the object having a spacing of no less than about 0.1 millimeter; and e. each of said reference beams and each of said scene beams of said first and second frequencies being directed along identical paths toward said light-sensitive medium.

16. The method as defined in claim 15 wherein said two laser beams are generated simultaneously.

17. The method as defined in claim 15 wherein said two laser beams are generated in sequence.